June 5, 1962  G. V. LOVSEY  3,037,223
APPARATUS FOR TREATING THE FINISH OF AUTOMOBILES
Filed Nov. 16, 1955  8 Sheets-Sheet 4

INVENTOR.
GEORGE V. LOVSEY
BY
*Schmieding and Fultz*
ATTORNEYS

June 5, 1962 G. V. LOVSEY 3,037,223
APPARATUS FOR TREATING THE FINISH OF AUTOMOBILES
Filed Nov. 16, 1955 8 Sheets-Sheet 5

INVENTOR.
GEORGE V. LOVSEY
BY
*Schmieding and Fultz*
ATTORNEYS

Fig. 14.

United States Patent Office 3,037,223
Patented June 5, 1962

3,037,223
APPARATUS FOR TREATING THE FINISH OF AUTOMOBILES
George V. Lovsey, 1059 Scott, Columbus, Ohio
Filed Nov. 16, 1955, Ser. No. 547,079
4 Claims. (Cl. 15—21)

This invention relates to apparatus for treating the finishes of automobiles and particularly to novel apparatus for automatically washing and polishing automobiles as they are successively conveyed along a path.

In general the present invention is installed in a building provided with a supporting surface forming a path along which automobiles are successively moved by an endless conveyor. Each automobile is moved through a washing zone formed by a plurality of sections along the path. The washing sections consist of a wetting and soaping section, a clear water rinse section, a heat drying section, and a dry brush section. Since the washing operation is completed at the dry brush section an exit runway is provided whererby the automobile can be moved out of the path after being disconnected from the conveyor.

If in addition to washing the automobile it is desired to polish same, the automobile is not removed from the path at the exit runway but, instead, is attached to a second conveyor which moves the vehicle through a polishing zone consisting of a polish applying section and a series of buffing sections which serve to automatically polish the finish of the automobile. The automobile is then detached at the end of the second conveyor and removed from the path.

The present apparatus includes a plurality of rotatable rollers having flexible peripheral surfaces which are automatically moved into contact with and positioned relative to the surface of an automobile moving along the path. A plurality of liquid dispensing means are also provided at appropriate locations along the path. Such dispensing means serve to automatically apply water, soap, or liquid polish to the finish of an automobile at the appropriate location along the path.

The apparatus of the present invention further includes novel apparatus for automatically washing and polishing the wheels and tires of a vehicle.

It is therefore an object of the present invention to provide apparatus of the type described provided with rotatable members which automatically engage and wash or polish the finish of an automobile without the need of a human operator.

It is another object of the present invention to provide apparatus of the type described which automatically and economically applies soap, water or polish to the finish of an automobile when and in the amount required whereby economy in the consumption of such products is realized.

It is another object of the present invention to provide apparatus of the type described which automatically picks up automobiles at the entrance to a washing or polishing zone, conveys same along a path through such zone, and then releases the automobiles for removal from the path at the end of the zone.

It is another object of the present invention to provide apparatus of the type described which includes improved means for automatically washing or polishing the wheels and tires of an automobile as such vehicle is moved through a washing or polishing zone.

It is still another object of the present invention to provide apparatus of the type described which includes flexible rotating members for treating the finish of an automobile, which members are provided with novel moveable mounting means for locating the members and novel driving means for rotating the members.

Further objects and advantages of the present invention will be apparent from the following description, reference being had to the accompanying drawings wherein a preferred form of embodiment of the invention is clearly shown.

In the drawing:

FIGURE 15-A is a diagrammatic view showing the general electrical layout and related structure of a portion of the apparatus of the present invention; and FIGURE 15-B is a diagrammatic view showing the general electrical layout and related structure of a second portion of the apparatus of the present invention.

Figure 1:
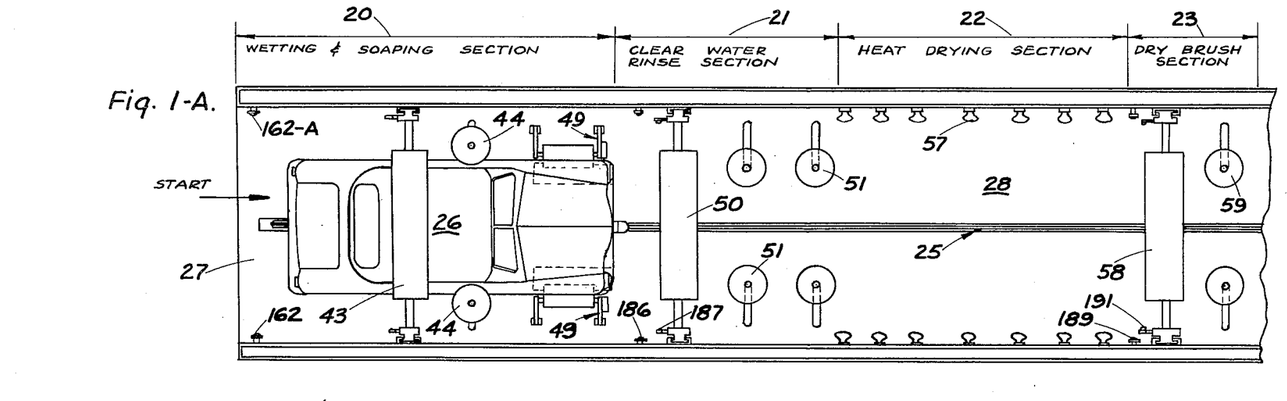
FIGURE 1A is a top view of an automobile washing zone which includes apparatus constructed according to the present invention.
FIGURE 1B is a top view of an automobile polishing zone which includes apparatus constructed according to the present invention.
Figure 2:
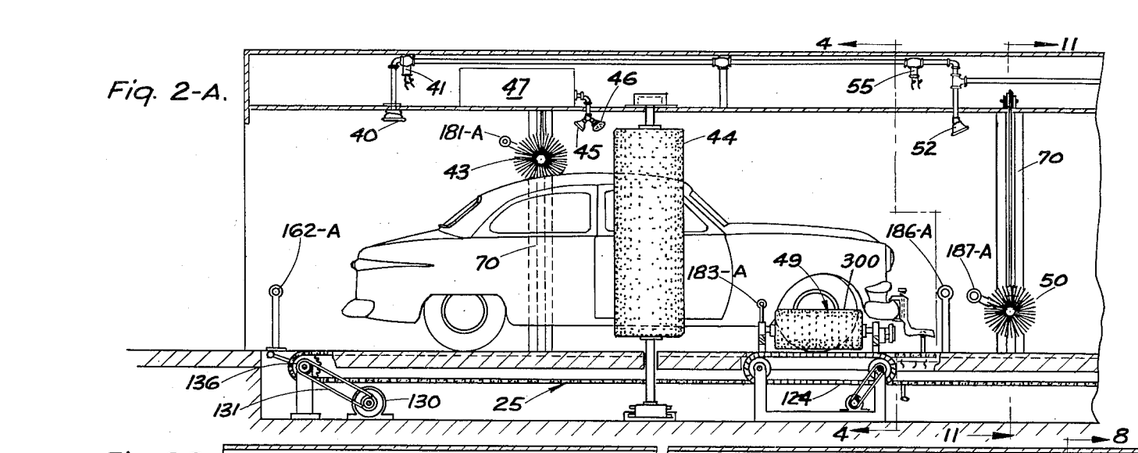
FIGURE 2A is a side view, partially in section, of a portion of the washing zone of FIGURE 1A. The section is taken along a vertical plane passing longitudinally through the zone.
FIGURE 2B is a side view, partially in section, of a second portion of the washing zone of FIGURE 1A. The section is taken along a vertical plane passing longitudinally through the zone.
FIGURE 2C is a broken side view, partially in section, of the polishing zone of FIGURE 1B. The section is taken along a vertical plane passing longitudinally through the zone.

Referring to the drawing FIGURES 1A, 2A, and 2B illustrate an automobile washing zone to which apparatus constructed according to the present invention has been applied. Such zone includes a wetting and soaping section 20, a clear water rinse section 21, a heat drying section 22, and a dry brush section 23.

A conveyor indicated generally at 25 is provided for picking up an automobile 26 at the entrance 27 of path of movement across the supporting surface 28 and for releasing the automobile at the exit runway 30.

Starting at the end of exit runway 30 the washing zone is following by a polishing zone which consists of a polish applying section 32 and a series of buffing sections 33. A second conveyor 35 serves to pick up an automobile at the entrance to the polishing zone and to release the vehicle at the end 36 of the path of travel through the apparatus.

Referring particularly to the washing section 20 of FIGURES 1A and 2A, such section includes a water outlet 40 for wetting the vehicle. A valve 41 controlled in a manner later to be described serves to turn the water outlet on and off responsive to entry and departure of the vehicle into and out of the wetting zone.

A scrubbing roller 43 having a flexible periphery is extended horizontally across the wetting section for engaging the upper surfaces of the hood, body and trunk of the vehicle. A pair of laterally spaced vertical scrubbing rollers 44 each having a flexible periphery engage the side surfaces of the vehicle and liquid soap outlets 45 and 46 serve to apply liquid soap to the horizontal roller 43 and the vertical rollers 44. A supply of liquid soap is contained in a tank 47 connected with the soap outlets 45 and 46.

The washing zone 20 is further provided with two laterally spaced mechanisms 49 which include rotary brushes 300 serve to scrub the wheels and tires of a vehicle as it is moved through the section.

Referring to the clear water rinse section 21, a horizontal rotary brush 50 and a plurality of vertical rotary brushes 51 are wetted by the water outlets 52, 53, and 54 which outlets are turned on and off by the valve means 55 in a manner later to be described.

Proceeding further along the path through the washing zone, after the vehicle is rinsed with clear water it moves into the heat drying section 22 which includes a plurality of heat lamps 57 provided for drying both the top and sides of the vehicle. To apply further drying action to the finish of the vehicle a dry horizontal rotary brush 58 and dry vertical rotary brushes 59 are located in the dry brush section 23 through which section the vehicle is moved prior to either entering the polish zone or leaving the path at exit runway 30.

With reference to FIGURES 1B and 2C, if the vehicle is to be polished it is first moved into polish applying section 32 wherein it is subjected to the action of horizontal rotary brush 60 and vertical rotary brushes 61 which rotary brushes are supplied with liquid polish through the outlets 62, 63, and 64 which outlets receive liquid polish from a tank 65. The polish applying section 32 further includes a pair of laterally spaced mechanisms indicated generally at 49 which are identical to the mechanisms 49 of the washing section except that liquid polish, instead of liquid soap, is automatically applied to the wheels of the vehicle as it is moved through the section.

Moving further along the path from the polishing section, the vehicle is next moved through a buffing section 33 provided with a plurality of horizontal rotary brushes 67 and a plurality of vertical rotary brushes 68 for buffing the top and sides of the vehicle after the liquid polish has been applied.

Figures 11, 12, 13:
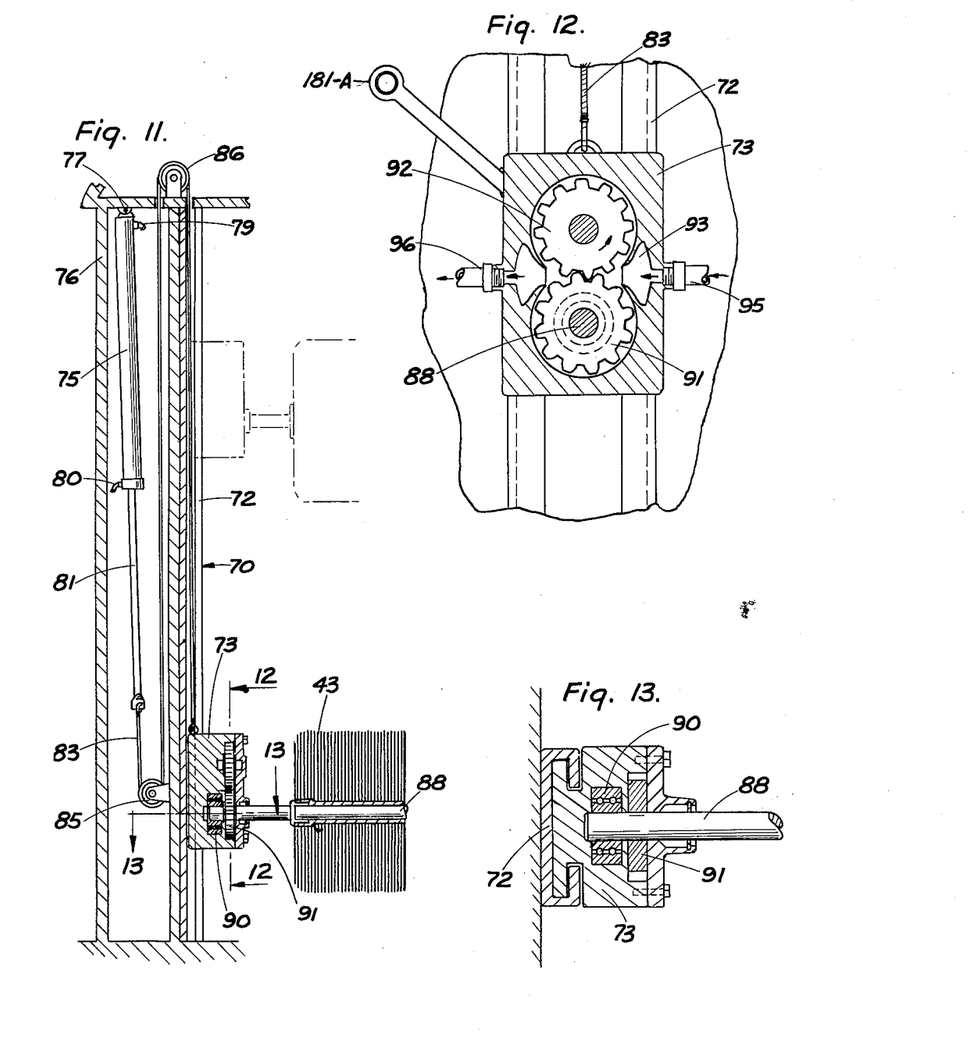
FIGURE 11 is a sectional view illustrating apparatus for driving and vertically moving and positioning horizontal flexible rollers which form a portion of the apparatus of the present invention. The section is taken along the line 11—11 of FIGURE 2A.
FIGURE 12 is a side sectional view of a portion of the apparatus of FIGURE 11, the section being taken along the line 12—12 of FIGURE 11.
FIGURE 13 is a top sectional view of the apparatus of FIGURE 12, the section being taken along the line 13—13 of FIGURE 11.

Reference is next made to FIGURES 11, 12, and 13 which illustrate a mechanism, indicated generally at 70, for adjustably mounting the horizontal brushes 43, 50, 58, 60 or 67. Such mechanism includes a pair of horizontally spaced vertical tracks 72 each of which slideably carries a sliding block 73. A fluid actuated cylinder 75 is secured to frame 76 at 77 and connected to a source of pressurized fluid, not illustrated, by a pair of lines 79 and 80. The piston rod 81 of the fluid actuated cylinder 75 is connected to sliding block 73 by a cable 83 which cable is guided by pulleys 85 and 86.

When pressurized fluid is introduced into cylinder 75 through line 80 the blocks 73 and roller 43 will be raised and when fluid is exhausted through line 80 the roller is lowered.

With continued reference to FIGURES 11, 12, and 13, the sliding blocks 73 rotatably support a shaft 88 in bearings 90. A gear 91 is keyed to shaft 88 and combines with a gear 92 to form a fluid actuated motor carried in a sealed chamber 93. Pressurized fluid is introduced into sealed chamber 93 through a line 95 connected to a source of pressurized fluid such as a pump, not illustrated, and a line 96 exhausts fluid from the sealed chamber to a low pressure zone such as the intake side of a fluid pump.

When pressurized fluid is introduced at line 95 the flow of fluid serves to rotate gears 91 and 92 which impart rotation to shaft 88 and horizontal roller 43 mounted thereon.

Figure 8:
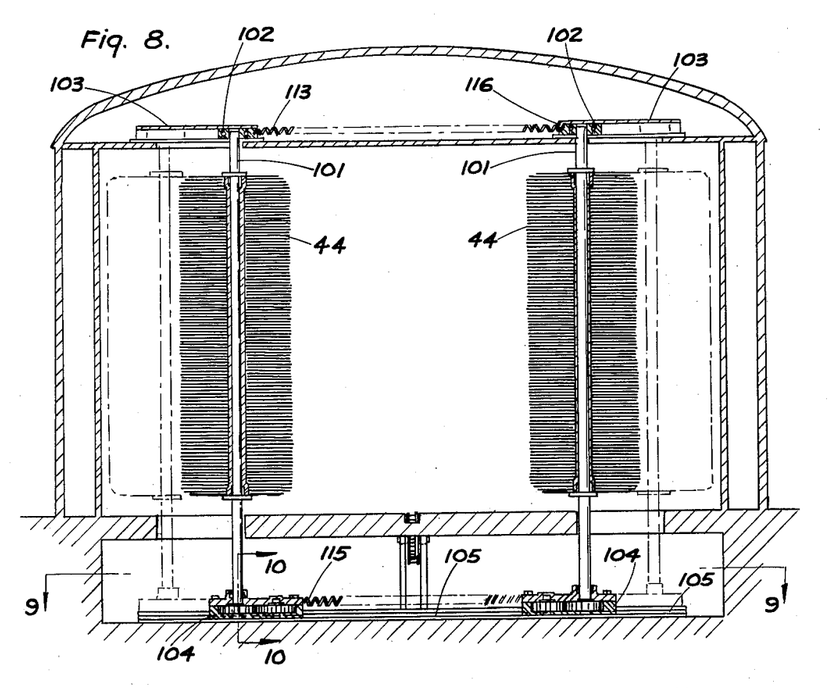
FIGURE 8 is an end sectional view taken through the drying section of the present invention, the section being taken along the line 8—8 of FIGURE 2B.
Figure 9:
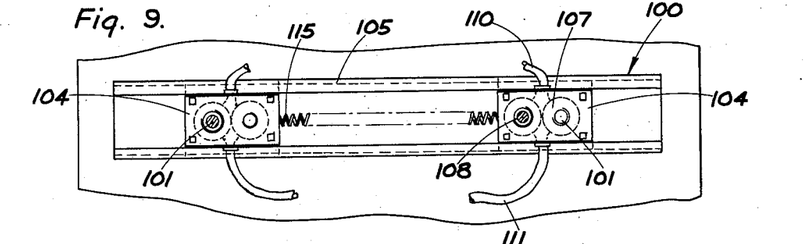
FIGURE 9 is a top view showing a moveable mounting means and driving means utilized for mounting and driving the flexible rollers incorporated in the apparatus of the present invention.
Figure 10:
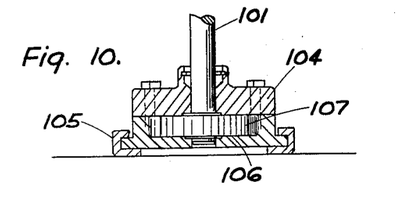
FIGURE 10 is a sectional view of the mounting and driving apparatus of FIGURE 9, the section being taken along the line 10—10 of FIGURE 8.

Reference is next made to FIGURES 8, 9, and 10 which illustrate apparatus for horizontally adjusting the distance between vertical rollers such as 44, 51, 59, 61 and 68 with such apparatus being indicated generally at 100. Each of the vertical rollers 44 is mounted on a shaft 101 by an upper sliding block 102 carried by a track 103 and a lower sliding block 104 carried by a track 105.

Lower sliding blocks 104 each form a sealed chamber 106 which encloses a gear 107 keyed to roller shaft 101 which gear cooperates with a second gear 108 to form a fluid motor driven by pressurized fluid introduced through one of the lines 110 or 111 and exhausted through the other.

One of the lines 110 and 111 is connected to a source of pressurized fluid such as a pump, not illustrated, and the other of the lines leads to a low pressure zone whereby the flow of fluid through the sealed chambers 106 rotates gears 107 and 108 and hence vertical shafts 101 and rollers 44 mounted thereon.

The upper sliding blocks 102 are constantly urged inwardly, one towards the other, since they are connected by a tension spring 113, and, in a like manner, lower sliding blocks 104 are constantly urged inwardly by a tension spring 115. Hence it will be understood that rollers 44 normally occupy the location illustrated in FIGURE 8 wherein upper sliding blocks 102 are against inner stops 116 and hence at the limit of their inward travel along tracks 103.

Figure 4:
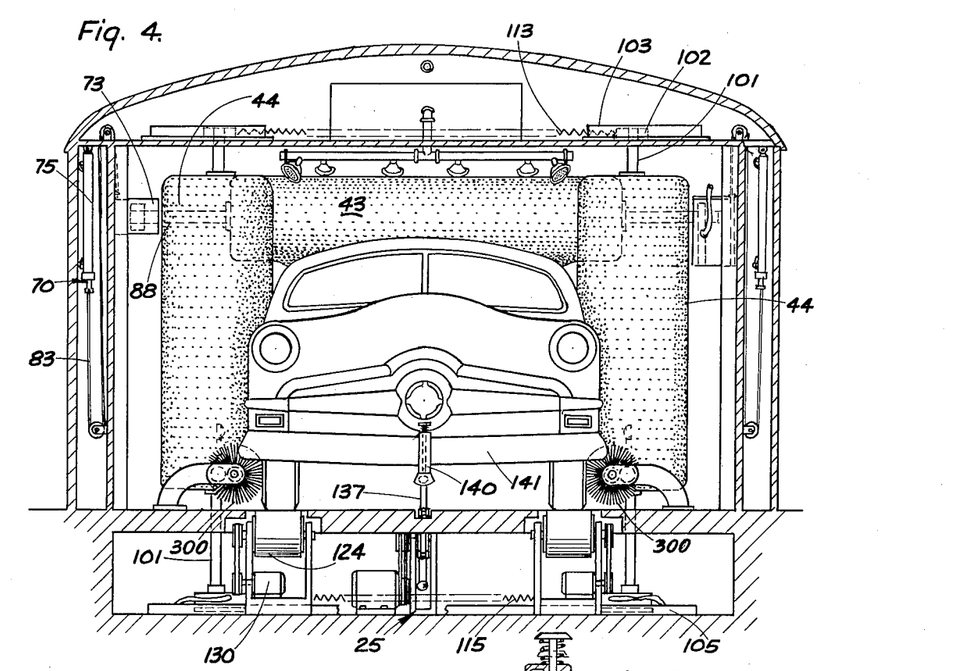
FIGURE 4 is an end sectional view of the washing zone of FIGURE 1A, the section being taken along the line 4—4 of FIGURE 2A.
Figure 5:
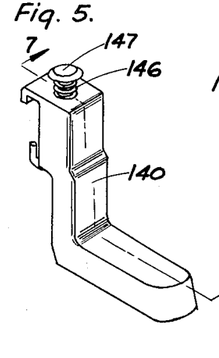
FIGURE 5 is a perspective view of a device constructed according to the present invention and utilized for automatically connecting and disconnecting automobiles to a conveyor for moving same through the washing or polishing zones of the preceding figures.
Figure 6:
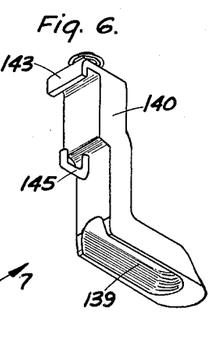
FIGURE 6 is a second perspective view of the device of FIGURE 5.
Figure 7:
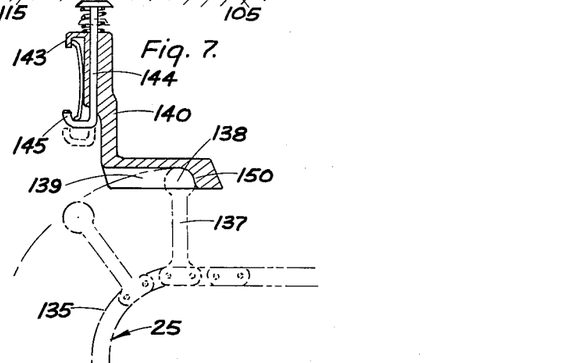
FIGURE 7 is a side sectional view of the device of FIGURE 5.

When a vehicle engages the vertical rollers 44 they are urged outwardly apart, against the action of springs 113 and 115, in the manner illustrated in FIGURE 4. As the vehicle passes between the rollers 44 such rollers will move inwardly and outwardly to conform with the contour of the particular vehicle.

Figures 2, 3:
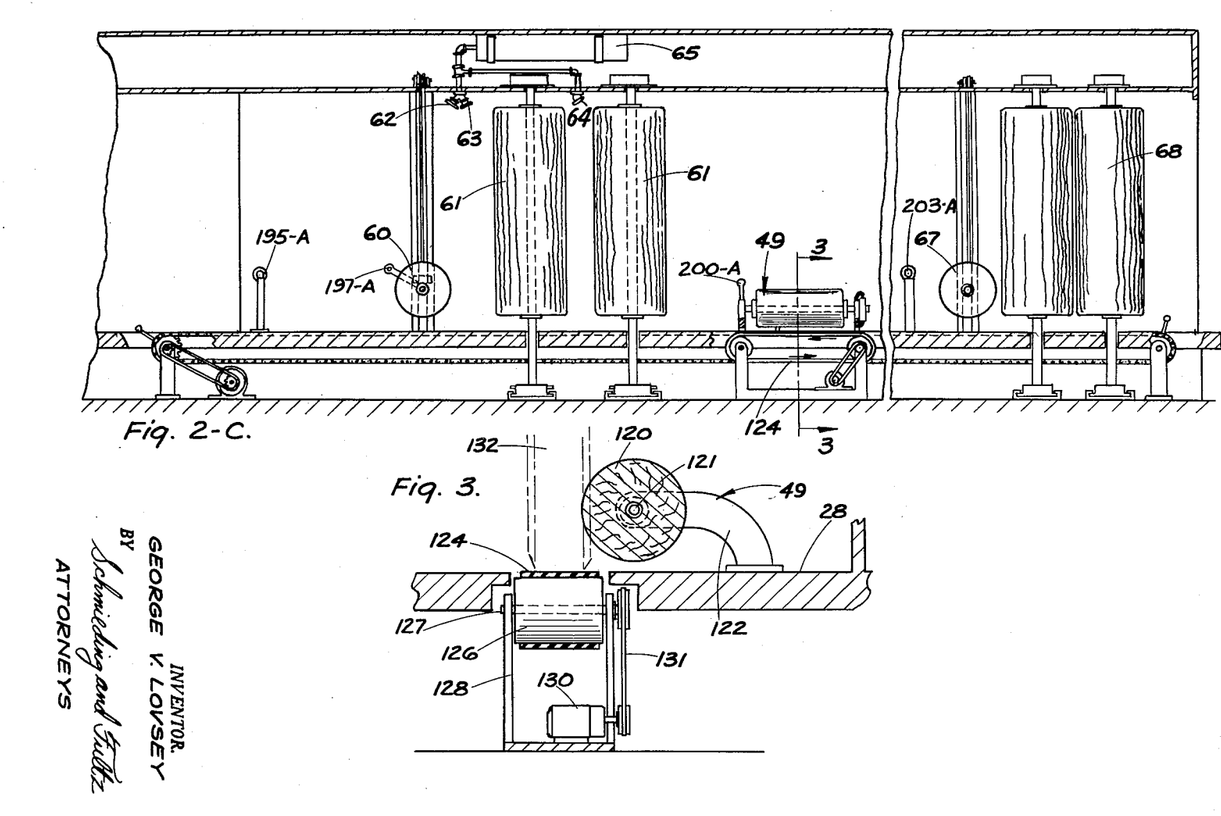
FIGURE 3 is a sectional view of a wheel and tire washing apparatus constructed according to the present invention with the section being taken along the line 3—3 of FIGURE 2C.

Reference is next made to FIGURES 3 and 2C which illustrate the previously mentioned wheel and tire washing apparatus 49. Such apparatus comprises a flexible roller 120 mounted on shaft 121 rotatably carried by brackets 122 extending upwardly from floor 28. The shaft and roller may be rotated by means of a fluid motor of the type illustrated in FIGURE 12 and previously described. The apparatus of FIGURE 3 further includes an endless tread 124 having an upper surface in substantially the same plane as floor 28. Endless tread 124 is mounted on a pair of spaced pulley drums 126 which are mounted on shafts 127 which are rotatably carried by brackets 128. Pulley drum 126 is connected to the shaft of a motor 130 by a belt 131.

In operation of the apparatus 49, when a wheel 132 of a vehicle is moved onto endless tread 124, operation of motor 130 is instituted, in a manner later to be described, which causes movement of the upper surface of endless tread 124 and hence rotation of vehicle wheel 132. At the same time vehicle wheel 132 is being rotated, the flexible wheel and tire washing roller 120 is also actuated, in a manner later to be described, whereby the outer surface of the wheel and tire are treated in the desired manner, depending on the station at which the vehicle has arrived.

Reference is next made to IGURES 4, 5, 6, and 7 which illustrate operation of the conveyor previously mentioned and indicated generally at 25. Such conveyor includes an endless chain 135 driven by sprockets 136, FIGURE 2A, which chain is provided with a plurality of projections 137 mounted at spaced intervals along the length of chain 135. Each projection 137 includes a ball 138 adapted to enter and engage with a socket 139 formed in a bumper bracket 140 adapted for attachment to a bumper 141 of a vehicle as seen in FIGURE 4. Bracket 140 includes an upper stationary hook portion 143 and a shank 144 slideably carried by the body of the bumper bracket. Shank 144 forms a lower hook portion 145 which is constantly urged upwardly by a compression spring 146 and a handle 147 is provided on the top of shank 144 for moving the hook portions apart when the bumper clamp is to be attached to the bumper of a vehicle. In operation, prior to a vehicle being presented to the entrance 27, FIGURE 1A, a bumper bracket 140 is fastened to the center of the front bumper 141 thereof. The car is driven forwardly until the socket 139 of the bumper bracket 140 is in overlying alignment with the endless chain 135 of conveyor 25. One of the projections 137 will then be moved upwardly whereby ball 138 thereof enters socket 139 and moves forwardly against shoulder 150. As the projection 137 latches with shoulder 150 the vehicle is drawn forwardly through the various stations until the conveyor 25 ends at 152 as seen in FIGURE 1B. At this location 152 the projection 137 is drawn downwardly out of socket 139 and away from driving engagement with shoulder 150. The vehicle is then either driven out through the exit runway 30 or into the polishing section 32 at the entrance of which the bumper bracket 140 is picked up at 153 by the second conveyor 35 in the same manner as the pick up action of the first conveyor 25.

As best seen in FIGURE 2A, the sprockets 136 of conveyor 25, or conveyor 35, are driven from a motor 130 by a belt 131.

Figure 14:
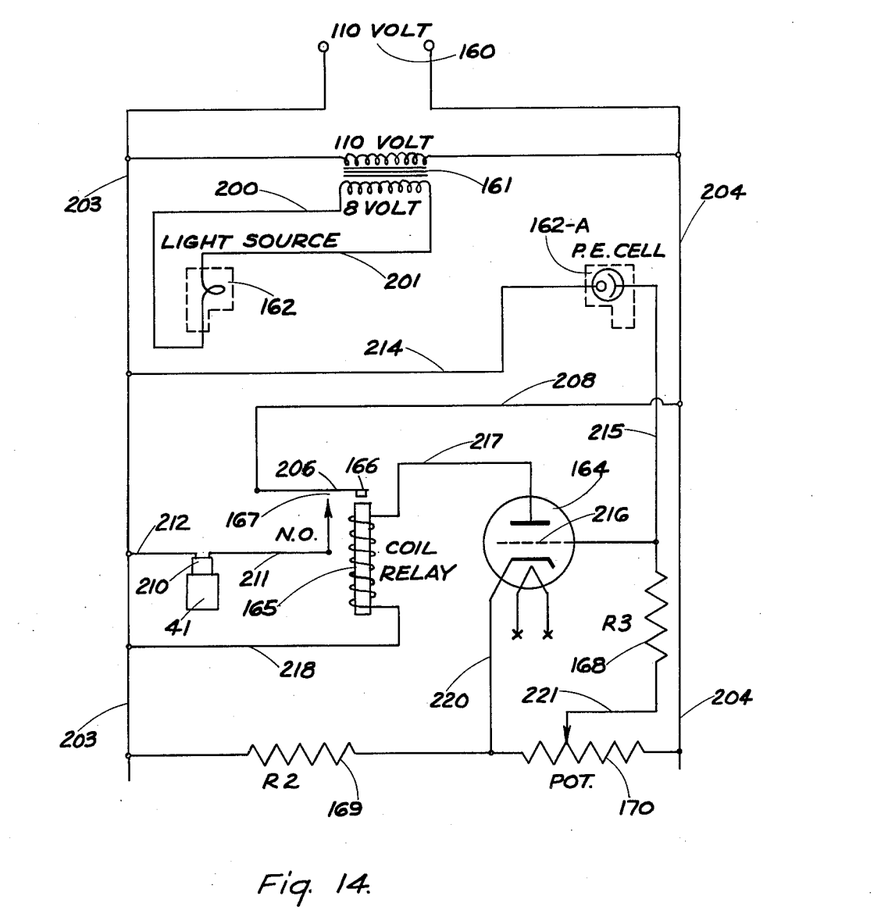
FIGURE 14 is a diagrammatic view of a circuit and related structure of the apparatus of the present invention.
Figure 15:
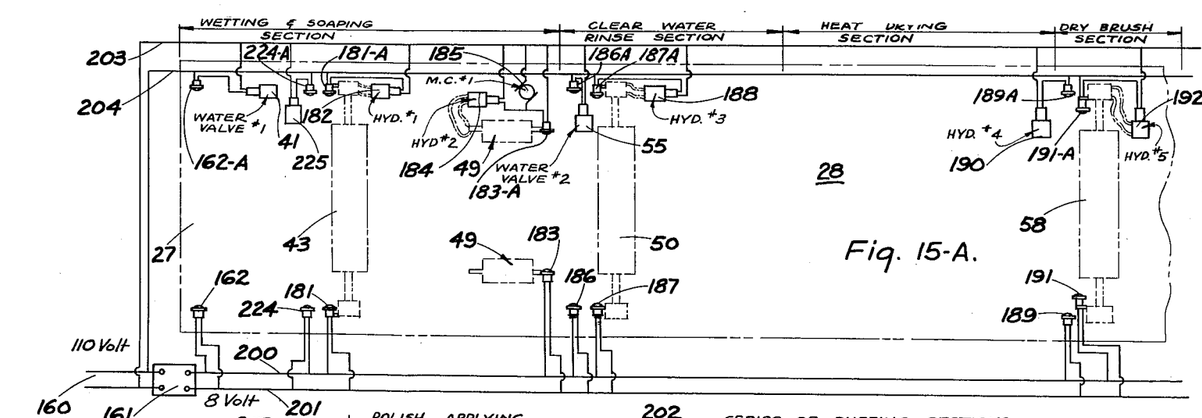

Reference is next made to FIGURES 14, 15–A and 15–B which diagrammatically illustrate the electrical system of the present invention.

The previously mentioned water valve 41 of FIGURE 2A, at the entrance to the soaping section is again illustrated in FIGURE 15–A, together with a photo-electric light source 162 and light sensitive receiver 162–A which produce a control beam that is interrupted when a vehicle enters the path at 27.

It will be understood that FIGURES 15–A and 15–B represent a diagrammatic view of the over-all electric layout for the complete system and do not show all of the electric components required to actuate a particular portion of the system.

FIGURE 14, however, diagrammatically represents a complete electric circuit and shows all of the elements thereof required to actuate a particular valve of the system. For example, any of the valves 41, 182, 55, 188, 190, 192, 196, 198, 201, or 204 can be actuated by the one or more of the photo-electric circuits illustrated in FIGURE 14. Moreover, the circuit of FIGURE 14 is utilized to actuate the motor contactors 185 and 202 which serve to energize the motors 130 for driving the endless treads previously described.

Referring particularly to FIGURE 14, a source of electric current, say at 110 volts, is indicated generally at 160.

The hydraulic valve being controlled, such as 41 illustrated, is connectable between the wires 203 and 204 leading to the main current source, by contacts 166 and 167. Contact 166 is carried on movable arm 206 of coil relay 165 and is connected to wire 204 by a wire 208. Contact 167 is connected to a solenoid 210, by actuating valve 41, by a wire 211, and a wire 212 leads from solenoid 210 to the other main lead 203.

A light source 162 is connected to the secondary of a transformer 161 provided to supply current at an appropriate low voltage, say 8 volts, to the photo-electric light source.

Light source 162 projects a light beam across the path traveled by the vehicles and onto the light-sensitive receiver 162–A. A wire 214 leads from receiver 162–A to the high voltage wire 203 and a second wire 215 connects receiver 162–A to the grid 216 of vacuum tube 164. Vacuum tube 164 serves as an amplifier for the impulse produced by light-sensitive receiver 162–A and is connected to one end of the coil of relay 165 by a wire 217, the other end of the coil being connected to high voltage wire 203 by a wire 218.

The circuit of FIGURE 14 can be balanced by resistances 168 and 169 and the sensitivity of the circuit is controlled by a potentiometer 170. Vacuum tube 164 is connected intermediate resistance 169 and potentiometer 170 by wire 220, with resistance 169 leading to the main current line 203 and potentiometer 170 having an end of its coil connected to main current line 204 and a sliding contact connected to the resistance 170 by a wire 221.

Reference is next made to the general electrical layout of FIGURES 15–A and 15–B. Proceeding along the path of vehicle travel from the wetting section and first valve 41, certain of the control valves for operating portions of the apparatus, and photo-electric cells for actuating same, are diagrammatically illustrated at appropriate locations along the path of vehicle travel.

When the vehicle breaks the beam between light source 162 and the associated photo-electric cell 162–A the water valve 41 is actuated and water is sprayed from head 40 onto the finish of the vehicle. When the vehicle breaks the beam between light source 224 and the associated photo-electric cell the valve 225 is operated to actuate the fluid motor, such as is illustrated in FIGURE 12 and previously described. Hence rotational power is automatically supplied to horizontal brush 43 when needed. When the beam between light source 181 and the associated photo-electric cell 181–A is broken the valve 182 is actuated to operate the raising and lowering mechanism 75 of FIGURE 11. This action serves to vertically position brush 43.

To describe such vertically positioning of brush 43 reference is made to FIGURES 2A and 15–A, which illustrate light source 181 and its associated photo-electric cell 181–A as being mounted on vertically moveable roller mounting blocks 73. See also FIGURE 12 wherein such mounting of a photo-electric cell, such as 181–A, is illustrated in enlarged relationship. When the front of the auto, such as the grill section, is moved across the light beam between source 181 and cell 181–A, horizontal brush 43 will be raised and continue to rise so long as such beam is broken by the presence of the auto. Hence when the brush 43 rises to a position wherein the beam is above the hood over the engine of the auto the brush 43 will discontinue upward movement since valve 182 will at such position terminate delivery of hydraulic fluid to the brush raising cylinder 75, FIGURE 11. It will be understood that brush 43 will hence be maintained in contact with the surface of the hood over the engine of the auto until the auto progresses along its path to a position wherein the light beam between source 181 and cell 181–A is broken by a higher portion of the vehicle structure in the vicinity of the windshield. The brush 43 is then again raised since breaking of the beam between source 181 and cell 181–A energizes valve 182 which institutes delivery of hydraulic fluid to brush raising cylinder 75, FIGURE 11. Hence horizontal brush 43 is raised from a lower hood-contacting elevation to a higher elevation wherein brush 43 contacts the roof of the auto in the manner illustrated in FIGURES 1A and 2A. When the auto progresses beyond the position of FIGURES 1A and 2A the brush 43 moves downwardly since valve 182 is deenergized whereby brush raising cylinder 75, FIGURE 11, can exhaust hydraulic fluid from line 80 to tank.

In view of the foregoing description it will be understood that light source 181 and photo-electric cell 181–A, being carried on the brush mounting blocks 73, provide a moveably mounted detector means for controlling a power means, provided by brush raising cylinder 75 and the associated hydraulic fluid translating apparatus, which detector means and power means serve to variably locate a rotatable means, in the form of brush 43, in accordance with variations in the location of the finish being treated.

It will be understood that the other horizontal rollers 50, 58, 60, and 67 are provided with detector means and power means, of the type just described in connection with horizontal brush 43, which detector means and power means serve to variably locate such other horizontal rollers in accordance with variations in the location of the finish being treated.

It will be understood that actuation of valve 182 can also be adapted to institute rotation of the vertical brushes 44 which brushes are also located in the wetting and soaping section as illustrated in FIGURE 2A.

When the vehicle breaks the beam between light source 183 or 200 and a respective photo-electric cell, the valve 184 and motor contactor 185, or valve 201 and motor contactor 202, will be actuated. The motor contactors actuate motors 130 for operating the endless treads 126 and the valves actuate fluid motors, such as the one illustrated in FIGURE 12 to rotate the vehicle wheels and flexible rollers 49. This action cleans or polishes the wheels and tires of the vehicle in the manner previously described.

Proceeding down the line another water valve 55 is shown for the rinse section, with such valve being actuated when the vehicle breaks the beam between light source 186 and the associated photo-electric cell.

In the dry brush section the light source 189 and the associated photo-electric cell serve to actuate valve 190 to supply rotational power to roller 58 and rollers 59. Valve 190 is connected by hydraulic lines, not illustrated in FIGURE 15–A, to a fluid motor such as is illustrated in FIGURE 12 for driving horizontal roller 58, and also to fluid motors such as are illustrated in FIGURE 9 for driving vertical rollers 59. Light source 191 and the associated photo-electric cell 191–A serve to actuate valve 192 for raising and lowering roller 58 by means of a mechanism such as is illustrated in FIGURE 11.

In the polish applying section when the beam between light source 195 and the associated photo-electric cell is broken a valve 196 is actuated to supply rotational power to the horizontal roller 60 and vertical rollers 61. The valve 198, for raising and lowering horizontal rollers 60, is actuated when the vehicle breaks the beam between light source 197 and the associated photo-electric cell 197–A.

In the last section, a valve 204 is actuated when the beam between light source 203 and the associated photo-electric cell is broken to institute rotation of the horizontal buffing rollers 67 and the vertical buffing rollers 68. The light source 205 and the associated photo-electric cell, at the end of the buffing section, are also connected with valve 204 for closing same when the vehicle leaves the path to stop rotation of the buffing rollers 67 and 68.

The vertical adjustments for horizontal buffing rollers are also controlled by a valve and photo-electric circuit of the same type utilized in connection with the other horizontal rollers previously described.

While the form of embodiment of the present invention is herein disclosed constitutes a preferred form, it is to be understood that other forms might be adopted, all coming within the scope of the claims which follow.

I claim:

1. Apparatus for treating the finishes of automobiles comprising, in combination, conveyor means for moving automobiles successively along a path; a rotatable member located along said path and provided with a flexible periphery engageable with the finish of an automobile being moved by said conveyor means; power means for driving said rotatable member; means providing a source of energy for said power means; means for connecting and disconnecting said power means with said source; detector means responsive to movement of an automobile into said path, said detector means being operatively connected to said means for connecting and disconnecting said power means with said source, and said detector means including a light source located on one side of said path and a photo-electric cell located on the other side of said path for receiving a beam of light from said light source; a support for said rotatable member; movable mounting means connecting said rotatable member to said support; power means for actuating said movable mounting means to move said rotatable member to various locations relative to said support; and detector means carried by said movable mounting means and responsive to the location of the finish being presented to said rotatable member, said detector means being operatively connected to said power means for the mounting means to variably locate said rotatable member in accordance with variations in the location of the finish being treated.

2. Apparatus for treating the finishes of automobiles comprising, in combination, conveyor means for moving automobiles successively along a path; a rotatable member vertically disposed and located along said path and provided with a flexible periphery engageable with the finish of an automobile being moved by said conveyor means; a first track means extending transversely to and below said path; a first slide supported by said first track means and forming a mount for one end of said rotatable member; a second track means extending transversely to and above said path; a second slide supported by said track means and forming a mount for the other end of said rotatable member; driving means carried by certain of said slides for rotating said rotatable member; means forming a source of energy for said driving means; resilient means for moving said slides along said track means towards said path; a horizontally disposed rotatable member located along said path and provided with a flexible periphery engageable with the top of an automobile being moved by said conveyor means; a support for said horizontally disposed rotatable member; movable mounting means connecting said horizontally disposed rotatable member to said support; power means for actuating said movable mounting means to move said horizontally disposed rotatable member to various locations relative to said support; and detector means carried by said movable mounting means and responsive to the location of the finish being presented to said horizontally disposed rotatable member, said detector means being operatively connected to said power means to variably locate said horizontally disposed rotatable member in accordance with variations in the location of the finish being treated.

3. Apparatus defined in claim 2 characterized by said driving means consisting of a fluid motor and said source of energy consisting of means providing a flow of pressurized fluid to said fluid motor.

4. Apparatus defined in claim 2 characterized by said means for moving said slides along said track means being provided with a spring constantly urging said slides towards said path.

References Cited in the file of this patent
UNITED STATES PATENTS

| 1,411,321 | Wright | Apr. 4, 1922 |
| 1,479,841 | Stover | Jan. 8, 1924 |

(Other references on following page)

UNITED STATES PATENTS

| | | |
|---|---|---|
| 1,666,170 | Fitzpatrick | Apr. 17, 1928 |
| 1,698,189 | Dunbar | Jan. 8, 1929 |
| 1,720,785 | Elder | July 16, 1929 |
| 1,827,438 | Rauch | Oct. 31, 1931 |
| 1,931,444 | Mackin | Oct. 17, 1933 |
| 1,977,341 | Mackintosh | Oct. 16, 1934 |
| 2,215,692 | Fleming | Sept. 24, 1940 |
| 2,242,692 | Yingling | May 20, 1941 |
| 2,258,733 | Brackett | Oct. 14, 1941 |
| 2,321,983 | Brackett | June 15, 1943 |
| 2,490,921 | Rousseau | Dec. 13, 1949 |
| 2,530,720 | Paulson | Nov. 21, 1950 |
| 2,579,866 | Rousseau | Dec. 25, 1951 |
| 2,610,342 | Griffiths | Sept. 16, 1952 |
| 2,622,543 | Rousseau | Dec. 23, 1952 |
| 2,627,080 | Holmes | Feb. 3, 1953 |
| 2,636,198 | Wilson | Apr. 28, 1953 |
| 2,646,586 | Foutes | July 28, 1953 |
| 2,705,810 | McDermott | Apr. 12, 1955 |
| 2,740,414 | Moskow | Apr. 3, 1956 |
| 2,830,311 | Vizdos | Apr. 15, 1958 |

FOREIGN PATENTS

| | | |
|---|---|---|
| 617,409 | Germany | Aug. 17, 1935 |
| 1,007,574 | France | Feb. 6, 1952 |